Patented Mar. 13, 1951

2,545,184

UNITED STATES PATENT OFFICE 2,545,184

DIALLYL ESTERS AND POLYMERS THEREOF

Lynwood N. Whitehill, Berkeley, and Edward C. Shokal, Oakland, Calif., assignors to Shell Development Company, San Francisco, Calif., a corporation of Delaware No Drawing. Application June 11, 1945, Serial No. 598,894

13 Claims. (Cl. 260—78.3)

This invention relates to a new class of compounds and the polymers thereof. More particularly, the invention pertains to a new class of polymeric allyl esters having improved properties.

A great many different types of synthetic resins have been proposed of which a number are now manufactured on a commercial scale. The different types vary widely in physical properties and the association of several desirable properties in a single synthetic resin has been largely instrumental in determining its acceptability for usage on a commercial scale. In recent years, resinous polymers from a variety of types of allyl esters have been described in patents and journal articles. Many of these resinous allyl ester polymers have properties which appear to make them attractive for utilization on a commercial scale. Thus, some allyl esters give resinous polymers which are infusible, hard solids as well as being transparent so that they could be used as substitutes for glass. However, in order to be satisfactory for this purpose, it is vitally necessary that substantially no discoloration of the resin occur in the course of time. Other allyl ester resins display other properties which are outstanding, but these resins also have shortcomings which make their use disadvantageous and restricted for many purposes. In order for a resin to be useful for commercial application, it must possess all good qualities with none of the undesirable ones.

We have now discovered a new class of allyl esters which when polymerized to resinous polymers have a community of desirable physical properties without also having undesirable properties as are possessed with previously known closely related compounds. The compounds of the invention accordingly provide polymeric resins of great utility because the resins possess a combination of desired properties without sacrifice in other respects.

The compounds of the invention are beta,gamma-monoolefinic monohydric alcohol neutral esters of a hydroxy aliphatic dicarboxylic acid having the hydroxy groups of the acid esterified with saturated aliphatic monocarboxylic acids. The compounds include neutral esters of the formula

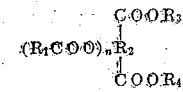

wherein $R_1$ is a monovalent saturated aliphatic hydrocarbon radical, $R_2$ is an aliphatic hydrocarbon radical, $R_3$ and $R_4$ are the hydrocarbon radicals of a beta,gamma-monoolefinic monohydric alcohol, and $n$ is an integer not greater than the number of carbon atoms contained in $R_2$. Preferably, $R_1$ contains not more than 3 carbon atoms and $R_2$ also contains not more than 6 carbon atoms. $R_3$ and $R_4$ are most preferably allyl radicals. When the ester is one with $R_2$ containing not more than 6 carbon atoms, $n$ is preferably an integer not greater than 4, but in any case not greater than the number of carbon atoms contained in $R_2$. Of the compounds of the invention, diallyl tartarate diacetate is a typical member and is also particularly preferred since the intermediates used in its preparation are readily available in commercial markets. The compound has the formula

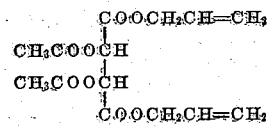

This compound can be polymerized to a hard, tough, infusible resin. It was quite unexpected that polymer of the ester as well as other members of the class possessed a combination of desirable properties when previously known, closely related compounds give polymers which, while possessing some good properties, were deficient in one or more other respects. Thus, polymeric diallyl phthalate is a hard, tough resin but is lacking in light stability. While the resin when first prepared is substantially water-white in color, it becomes in rather a short time noticeably yellow and this discoloration impairs its transparency so as to bar its suitability for many uses. This tendency to discolor is a fault of many allyl ester resins. Polymeric diallyl tartrate diacetate, on the other hand, has excellent light stability as well as being a hard, tough resin. Polymeric diallyl succinate is another material closely related to those of the invention. This material is of little general utility for the reason that the polymer is so lacking in strength that the usual routine physical tests used commercially cannot even be performed upon it, and consequently it has no practical use. Likewise, polymeric diallyl tartrate is a resin of desirable hardness and toughness as well as having good light stability, but the resin is deficient in resistance toward water and chemical reagents. It absorbs appreciable quantities of water and in dilute alkali it completely disintegrates in a short time. Polymeric diallyl tartrate diacetate, on the other hand, has extremely good resistance on contact with water, dilute acids or dilute alkalies.

It has also been suggested heretofore to react diallyl tartrate with a mixture of succinyl and adipyl chlorides. The product obtained from this reaction is in the nature of an alkyd resin. The mixture of succinyl and adipyl chlorides react with the free hydroxy groups of the diallyl tartrate so that a very viscous to solid polyester is formed. While this alkyd material can be polymerized by carbon-to-carbon bonding through the allyl groups, it is lacking in an important property. The polymer is opaque and has no transparency. Furthermore, the product before polymerization is a solid or very viscous substance and consequently cannot be used for the manufacture of reinforced articles such as laminates of paper or fabrics since these cannot be impregnated or immersed in the resin forming product without the use of solvents. In commercial practice the use of solvents is ordinarily prohibited because of unduly complicating the manufacture of the laminates. Diallyl tartrate diacetate is a mobile liquid which flows free and is adapted to impregnation of paper and fabrics by immersion in laminating operations. Polymers of the compounds of the invention are thus seen to possess a combination of desirable qualities without corresponding undesirable ones and are thus uniquely fitted for commercial usage.

As stated, the compounds of the invention are beta,gamma-monoolefinic monohydric alcohol neutral esters of a hydroxy aliphatic dicarboxylic acid having the hydroxy group or groups of the acid esterified with a saturated aliphatic monocarboxylic acid. By a "neutral" ester reference is made to the compound itself in that all of the carboxylic acid groups have been esterified with the unsaturated alcohol although the bulk material may contain traces of acid, as is usual even with highly purified esters. The compounds of the invention are probably most conveniently and understandably described in terms of the materials used for their preparation.

The beta,gamma-monoolefinic monohydric alcohols have a single olefinic double-bonded linkage between two carbon atoms which are in the beta and gamma positions with respect to the alpha carbon atom to which the single hydroxyl group is directly linked. These singly unsaturated alcohols contain the single olefinic linkage between two carbon atoms of aliphatic character to one of which carbon atoms is linked directly a saturated carbon atom having the hydroxyl group linked directly thereto and preferably the alcohols contain no other elements than carbon, hydrogen, oxygen and halogen. The alcohols can be either primary, secondary or tertiary alcohols, although primary alcohols are preferred. They can contain any number of carbon atoms, although preferably those containing up to but not more than 6 carbon atoms are used. Esters of a particularly suitable class of alcohols are those of beta-alkyl-substituted allyl alcohols, e. g. methallyl, ethallyl, etc. The most preferred esters are those from allyl alcohol. Some specific representative examples of beta,gamma-monoolefinic monohydric alcohols used in preparation of the esters of the invention include allyl alcohol, methallyl alcohol, crotyl alcohol, tiglyl alcohol, angelyl alcohol, buten-1-ol-3, penten-1-ol-3, 3-methyl-buten-1-ol-3, beta-chlorallyl alcohol, gamma-chlorallyl alcohol, 1-bromobuten-1-ol-3, 2-methylbuten-1-ol-3, cinnamyl alcohol, penten-2-ol-1, hexen-2-ol-1, octen-2-ol-1, decen-2-ol-1, dodecen-2-ol-1, tetradecen-2-ol-1, 2-cyclohexenol, 2-cyclobutenol, beta-phenylallyl alcohol, beta-cyclohexylallyl alcohol and the like.

The esters of the invention are derivable from a hydroxy aliphatic dicarboxylic acid of which any are suitable although dicarboxylic acids containing not more than 8 carbon atoms are preferred and tartaric acid is particularly preferred. The acid contains one or more hydroxy groups and when the radical between the carboxylic acid groups is saturated, it preferably contains as many hydroxy groups as there are carbon atoms in the radical. Representative specific examples of the class are such acids as tartronic, malic, isomalic or methyltartronic, citramalic or alpha-methylmalic, ethyltartronic, propyltartronic, beta-hydroxyisomalic, beta-methylmalic, beta,beta-dimethylmalic, alpha,beta-dimethylmalic, beta-ethylmalic, alpha,beta-methylethylmalic, trimethylmalic, isopropylmalic, gamma,delta-dihydroxy propylmalonic, tartaric, beta-hydroxyglutaric, alpha,gamma-dimethyl-beta-hydroxyglutaric, alpha,beta-dihydroxyglutaric, alpha,gamma-dihydroxyglutaric, alpha,gamma-dihydroxy-alpha,gamma-dimethylglutaric, alpha,gamma-dihydroxy-beta,beta-dimethylglutaric, trihydroxyglutaric, alpha-methyl-trihydroxyglutaric, alpha-hydroxyadipic, alpha,alpha'-dihydroxyadipic, trihydroxyadipic, tetrahydroxyadipic or saccharic, mannosaccharic, idosaccharic, mucic, talomucic, alpha-hydroxy-alpha-methyladipic, beta-methyl-beta-hydroxyadipic, alpha,alpha-gamma-trimethyl-beta-hydroxyadipic, pentahydroxypimelic, alpha,alpha'-dihydroxysuberic, and the like.

In the compounds of the invention, the hydroxy groups of the hydroxy aliphatic dicarboxylic acid have been esterified with a saturated aliphatic monocarboxylic acid. Any saturated aliphatic monocarboxylic acid can be used including such representative saturated acids as formic, acetic, propionic, butyric, isobutyric, valeric, isovaleric, chloracetic, trichloracetic, trimethylacetic, ethylpropionic, caproic, ethyl caproic, capric, lauric, palmitic, stearic, and the like. While any saturated aliphatic monocarboxylic acid can be used, the most useful compounds are obtained from saturated aliphatic hydrocarbon-monocarboxylic acids by which term is meant those monocarboxylic acids having the carboxylic acid group linked to a monovalent saturated aliphatic hydrocarbon radical. It is desirable that the saturated aliphatic monocarboxylic acid contain not more than 7 carbon atoms, and preferably, saturated fatty acids of not more than 4 carbon atoms are used of which acetic acid is most preferred.

The compounds of the invention can be prepared by any suitable method. Preferably, a two step esterification process is used. The unsaturated alcohol is first esterified with the hydroxy dicarboxylic acid and this ester is then esterified with the saturated monocarboxylic acid. The first step is effected by heating a mixture of the unsaturated alcohol and hydroxy dicarboxylic acid along with an esterification catalyst and a water-entraining agent in a vessel fitted with a fractionating column. The water of reaction is removed substantially as fast as formed with the aid of the water-entraining agent which distils the water as an azeotrope from the reaction mixture. When the esterification is complete, the mixture is subjected to distillation preferably under reduced pressure to remove volatiles, but the formed ester is not taken overhead as distillate. Instead, the saturated monocarboxylic acid is added along with water-entraining agent and if desired more esterification catalyst. Heating of the reaction mixture is then resumed with removal of water of reaction formed by the second reaction. When the reaction is complete in this second step, the catalyst is neutralized and the reaction mixture is preferably subjected to distillation and purification of the product. The desired ester is taken over as distillate except when too high boiling. Various substances are suitable as esterification catalyst like sulfuric acid, phosphoric acid, benzene sulfonic acid, zinc chloride and the like. Excellent results are obtained with p-toluene sulfonic acid as catalyst. The water-entraining agent is a substance of lower boiling point than the unsaturated alcohol and it has the ability to form an azeotrope with water which will separate into two layers on cooling. Hydrocarbons like benzene, toluene, xylene, octane, decane, or ethers like diisopropyl ether, dibutyl ether, diamyl ether, are suitable.

In preparing the esters of the invention, it may in some cases be desirable to use as reactants the lactone of the hydroxy dicarboxylic acid. The anhydride of the saturated monocarboxylic acid also provides a more rapid and complete reaction than the free acid. When the beta,gamma-monoolefinic monohydric alcohol is one containing an unsaturated tertiary carbon atom directly linked to the carbon atom having the hydroxyl group linked directly thereto as is the case with methallyl alcohol, for example, it may be desirable to employ a different method of production since such alcohols tend to rearrange in the presence of acids like the esterification catalyst. To avoid this difficulty, the ester can be prepared by reacting the corresponding chlorides or bromides of the unsaturated alcohol with the sodium or potassium salt of the hydroxy dicarboxylic acid. Another method is to employ an alcohol-exchange process wherein the methyl or ethyl ester of the hydroxy dicarboxylic acid is reacted with the unsaturated alcohol. These methods can of course be applied to preparation of all members of the series, if desired.

The compounds of the invention from acids having more than one hydroxy groups can have the groups esterified with different monocarboxylic acids, if desired. Thus a mixed tartrate ester can be prepared by reacting equimolal amounts of diallyl tartrate with propionic anhydride so that diallyl tartrate monopropionate is obtained. This compound is then reacted with acetic anhydride whereby diallyl tartrate monoacetate monopropionate is produced. Although it is most desirable to have all of the hydroxy groups of the hydroxy polycarboxylic acid esterified with the monocarboxylic acids, the invention contemplates compounds wherein part of the hydroxy groups remain unesterified.

It may also be desirable to employ a polymerization inhibitor when the esters of the invention are prepared. For this purpose tannic acid is particularly suitable. If desired, other inhibitors such as pyrogallol, hydroquinone, aniline, phenylene diamine, sulfur, thiophenol, or the like can be used.

The following examples are given for the purpose of illustrating the methods of production and some properties of the esters.

EXAMPLE I

Diallyl malate was prepared by direct esterification using about 700 grams of malic acid and 1190 grams of allyl alcohol with 3 grams of p-toluene sulfonic acid as catalyst. The water of reaction was removed as distillate with the aid of benzene as water-entraining agent. After about 20 hours heating, the reaction was complete and the volatiles were removed by distillation under reduced pressure. An analysis of a sample of the crude ester gave a saponification value of 0.934 eq. per 100 grams. The theoretical value is the same.

EXAMPLE II

Diallyl malate acetate was prepared from the crude ester of Example I. About 269 grams of crude ester was esterified with 250 grams of acetic acid using 2 grams of p-toluene sulfonic acid as catalyst and 150 cc. of benzene as carrier. The esterification required about 16 hours. The reaction product was treated with decolorizing charcoal, filtered and then flash distilled from a Claisen flask. A conversion to the ester of 52.5% was obtained. Analysis of the product gave the following values and showed it contained about 4% acetic acid.

|  | Found | Theoretical |
|---|---|---|
| Carbon, per cent | 55.5 | 56.1 |
| Hydrogen, per cent | 6.3 | 6.3 |
| Saponification value, eq. per 100 grams | 1.18 | 1.17 |
| Acidity to phenolphthalein, eq. per 100 grams | 0.07 | 0.0 |
| Specific gravity, $20/4$ | 1.1305 |  |
| Refractive index, 20/D | 1.4509 |  |

Treatment of the product with anhydrous potassium carbonate and redistillation reduced the acidity to about 1.8% acetic acid. The ester boiled at 94° C. under 0.8 mm. Hg pressure.

EXAMPLE III

Diallyl malate stearate was prepared from diallyl malate obtained as described in Example I. About 107 grams of the crude diallyl malate and 142 grams of stearic acid were heated with 2 grams of p-toluene sulfonic acid and 1 gram of zinc chloride. The water of reaction was removed azeotropically using benzene. The esterification required about 18 hours to reach completion whereupon the resulting solution was poured into a liter of hot methyl ethyl ketone and filtered with the aid of decolorizing charcoal. The filtrate was chilled to 0° C. and the precipitated stearic acid removed by filtration. The methyl ethyl ketone was evaporated from the filtrate leaving 165 grams of material (68.8% conversion) which the following analysis shows contained considerable stearic acid:

|  | Found | Theoretical for— | |
|---|---|---|---|
|  |  | Ester | Stearic Acid |
| Carbon, per cent | 71.4 | 70.0 | 76.2 |
| Hydrogen, per cent | 11.1 | 10.8 | 12.7 |
| Bromine No., gm. Br. per 100 gms | 29 | 75 | 0 |
| Acidity, eq. per 100 gms | 0.003 | 0.0 | 0.35 |
| Specific gravity, 20/4 | 0.941 |  |  |
| Refractive index, 20/D | 1.456 |  |  |

EXAMPLE IV

Diallyl tartrate was prepared from d-tartaric acid using 600 grams of acid, 940 grams of allyl alcohol, 3 grams of p-toluene sulfonic acid as catalyst and 200 cc. of benzene to remove the water of reaction as the azeotrope. The reaction required about 20 hours for completion after which the materials boiling up to 110° C. under 5 mm. Hg pressure were removed. A residue of 861 grams of crude diallyl tartrate was obtained corresponding to 93.6% conversion. Analysis of the product given below indicated it was about 97% pure:

|   | Found | Theoretical |
|---|---|---|
| Saponification value, eq. per 100 gms | 0.862 | 0.870 |
| Acidity to phenolphthalein, eq. per 100 gms | 0.09 | 0.0 |

EXAMPLE V

Diallyl tartrate diacetate was prepared from the diallyl tartrate described in Example IV using about 250 grams of ester, 300 grams of acetic acid, 200 cc. of benzene as carrier and 3 grams of p-toluene sulfonic acid as catalyst. About 40 cc. of water of reaction was removed in 16 hours whereupon 50 cc. of acetic anhydride was added and the reaction continued for an additional 8 hours. Volatiles were removed under reduced pressure, the residue dissolved in chloroform, washed with dilute sodium hydroxide and then with water. The chloroform was flashed off and the product distilled in vacuo whereby about 142 grams of the ester boiling at 127° C. under 0.4 mm. pressure were obtained. An analysis of the product gave the following results:

|   | Found | Theoretical |
|---|---|---|
| Carbon, per cent | 52.2 | 53.5 |
| Hydrogen, per cent | 5.8 | 5.7 |
| Saponification value, eq. per 100 gms | 1.26 | 1.27 |
| Acidity, eq. per 100 gms | 0.007 | 0.0 |
| Specific gravity, 20/4 | 1.1672 | |
| Refractive index, 20/D | 1.4529 | |

EXAMPLE VI

The preparation of diallyl tartrate diacetate was repeated using acetic anhydride as acetylating agent. About 640 grams of diallyl tartrate, 1 gram of p-toluene sulfonic acid as catalyst and 1 gram of tannic acid as polymerization inhibitor were heated on a steam bath and 830 grams of acetic anhydride was added dropwise. Heating was continued several hours and then the reaction mixture was distilled whereby about 787 grams of diallyl tartrate diacetate boiling at 130° C. under 0.5 mm. Hg pressure was obtained. This corresponds to a conversion of 91.5%. An analysis of the water-white product gave the following results:

|   | Found | Theoretical |
|---|---|---|
| Saponification value, eq. per 100 gms | 1.26 | 1.27 |
| Acidity, eq. per 100 gms | 0.001 | 0.0 |
| Bromine No., gram Br. per 100 gms | 103 | 101.5 |
| Specific gravity, 20/4 | 1.1672 | |
| Refractive Index, 20/D | 1.4529 | |

EXAMPLE VII

Diallyl tartrate dipropionate was prepared in the manner described in Example VI using about 607 grams of diallyl tartrate and 715 grams of propionic anhydride. The conversion to the ester which boiled at 152–156° C. at 0.3 mm. Hg pressure was 84.0%. The water-white product analyzed as follows:

|   | Found | Theoretical |
|---|---|---|
| Saponification value, eq. per 100 gms | 1.13 | 1.17 |
| Acidity, eq. per 100 gms | 0.001 | 0.0 |
| Bromine No., gram Br. per 100 gms | 96 | 93.5 |
| Specific gravity, 20/4 | 1.1233 | |
| Refractive index, 20/D | 1.4510 | |

EXAMPLE VIII

Diallyl tartrate dibutyrate was prepared in the manner described in Example VI using about 680 grams of diallyl tartrate and 100 grams of butyric anhydride. The conversion to the ester which boiled at 164–166° C. at 0.5 mm. Hg pressure was 53%. The water-white product analyzed as follows:

|   | Found | Theoretical |
|---|---|---|
| Acidity, eq. per 100 gms | 0.002 | 0.0 |
| Bromine No., gram Br. per 100 gms | 87.2 | 86.5 |
| Specific gravity, 20/4 | 1.0916 | |
| Refractive index, 20/D | 1.4510 | |

EXAMPLE IX d-Saccharic acid was prepared by oxidizing d-glucose with nitric acid. About 278 grams of d-glucose was dissolved in 850 cc. of 20% nitric acid and the solution was heated according to the following schedule: 3½ hours at 50 to 65° C., 2 hours at 55 to 50° C., 8 hours at 55 to 65° C., 8 hours at 65 to 80° C. and 4 hours at 94 to 100° C. About 12 grams of calcium carbonate was added to the cooled solution and, after standing overnight, the precipitate of calcium oxalate was removed, the filtrate giving no test for oxalate ion. The solution was neutralized to phenolphthalein with 30% potassium hydroxide and then evaporated at 50° C. to 430 grams under reduced pressure. The insoluble monopotassium salt of saccharic acid monolactone was formed by addition of 84 grams of acetic acid. After standing overnight, the product was collected and washed with a small quantity of cold 20% methanol. It was purified by boiling with 100 cc. of water for about 20 minutes. Although all the solid did not dissolve in the hot solution, a pure white product was obtained. The purified monopotassium salt of saccharic acid monolactone weighed about 43 grams.

EXAMPLE X

Diallyl saccharate was prepared from the monopotassium salt of saccharic acid monolactone described in Example IX. A solution of about 42 grams of the salt in 20 cc. of concentrated hydrochloric acid was treated with 500 cc. of allyl alcohol in six separate portions. Each portion was added to the saccharic acid solution, heated and stirred vigorously, then cooled and the allyl alcohol solution of saccharic acid decanted from the precipitate of potassium chloride. At the end of the treatment, the solution was concentrated by evaporation to a volume of about 200 cc. This solution was mixed with 150 cc. of benzene and 2 grams of p-toluene sulfonic acid, and was heated with removal of the water of reaction for about 26 hours. The volatile compounds were then distilled from the mixture under reduced pressure. The residue, consisting of about 42 grams of diallyl saccharate, was a heavy syrup.

EXAMPLE XI

Diallyl saccharate tetra-acetate was prepared from the crude diallyl saccharate described in Example X. About 40 grams of the ester and 1 gram of p-toluene sulfonic acid were dissolved in 150 grams of acetic anhydride and the solution heated to about 45° C. whereupon an exothermic reaction took place so the temperature rose to 65° C. spontaneously. The solution was cooled to 50° C. and then heated gradually to reflux temperature of 132° C. over a period of 45 minutes with an additional heating for 45 minutes at reflux temperature. The solution was then poured into water with vigorous stirring and after standing overnight a dark oil separated which was extracted with ether. The ether solution was extracted with 5% sodium hydroxide solution to remove acetic acid and incompletely esterified saccharic acid. The ether was evaporated from the solution leaving about 26 grams of viscous oil comprising the diallyl saccharate tetra-acetate which contained some material which was not completely esterified with acetic acid.

While the esters of the invention can be used as solvents, plasticizers, and softeners for resins and synthetic or natural rubber, the most important use of them is for the production of resinous polymers. The esters are polymerized by the use of heat alone or more preferably by heating in the presence of a polymerization catalyst. The various oxygen yielding polymerization catalyst are suitable for this purpose such as benzoyl peroxide, acetyl peroxide, benzoyl acetyl peroxide, lauryl peroxide, dibutyryl peroxide, succinyl peroxide, sodium peroxide, barium peroxide, tertiary alkyl hydroperoxides such as tertiary butylhydroperoxide, peracetic acid, perphthalic acid, perborates, persulfates, ozone, air and oxygen. The esters can be polymerized also in the presence of their own peroxides or their ozonides. Another class of polymerization catalysts is the di(tertiary alkyl) peroxides, notably di(tertiary butyl) peroxides as described and claimed in the copending application of Vaughn and Rust, Serial No. 481,052, filed March 29, 1943, now Patent No. 2,426,476. If desired, mixtures of polymerization catalyst can be used, a suitable mixture being that of benzoyl peroxide and ditertiary butyl peroxide as described and claimed in copending application, Serial No. 572,086, filed January 9, 1945, now abandoned. In some cases, it may be desirable to conduct the polymerization in the concurrent presence of both a catalyst and an inhibitor of polymerization. The amount of catalyst used will ordinarily be between about 0.01% and about 5%, although it is not necessarily limited to this range. In still other cases, it may be desirable to use no other agent to effect polymerization than heat. Polymerization is usually energized by the application of heat although both heat and light may be used together and in some cases light alone is sufficient. Temperatures between about 60° C. and 150° C. are preferred, although higher and lower temperatures can be used.

Like other diallyl and related esters, the compounds of the invention polymerize through three successive stages. Upon polymerizing a composition consisting of the ester, the soluble and fusible form of the polymer is first produced. This first polymer is ordinarily obtained in admixture with unpolymerized monomeric ester. It can be separated from the monomer by usual procedures and it is characterized by being soluble in many common organic solvents. At ordinary atmospheric temperatures this form of the polymer is either a viscous liquid or a soft solid, but it can be rendered flowable by heating. The soluble and fusible polymer is capable of being further polymerized either alone or as it forms in admixture with the monomer. Upon being further polymerized, the fusible polymer changes to a gel form which is insoluble in the common organic solvents including its monomer. Nevertheless, the insoluble gel is fusible and upon heating is rendered flowable. Both the soluble polymer and the fusible gel polymer are valuable materials for the usual resin molding operations effected under heat and pressure to form shaped articles because they still further polymerize to the final stage. This final form of the polymer is insoluble in common organic solvents as well as being infusible. Upon heating the infusible polymer at increasing temperatures, it finally reaches a temperature at which it decomposes, but intermediate between that temperature and room temperature, it does not become fusible or flowable although it may soften slightly so as to be capable of being bent or curved somewhat without breaking upon application of stress. The esters of the invention are thus seen to be thermosetting, resin-forming compounds and they pass through the three successive stages of polymerization to form first soluble polymer, then insoluble gel polymer and finally infusible polymer. While the intermediate polymeric forms can be obtained by interrupting the polymerization at a desired stage with separation of the polymer in the usual manner, the esters can be polymerized through to the final stage without interruption if desired. The interruption of the polymerization of the esters provides valuable materials for further processes. Incomplete polymerization can be used for the production of a syrup comprising a mixture of a monomer and fusible polymer which may be further worked and eventually substantially completely polymerized. The syrup may for instance be transferred to mold of any desired configuration and again subjected to polymerization conditions or it may be used in coating operations or in impregnating bibulous materials, such as paper, fabrics, etc., which in turn may be used in the production of laminates.

The esters of the invention are particularly suited for cast polymerization wherein the monomeric ester is polymerized through to the infusible polymer in one operation. Cast sheets or rods of the homopolymers are obtained in this manner. When 1% to 5% benzoyl peroxide is employed, the allyl esters completely polymerize at 60° C. to 70° C. in about 144 hours to a hard, tough resin. Longer or shorter times may be necessary or desirable with other particular esters. It is sometimes desirable to effect the polymerization over a schedule involving varying or increasing temperatures. Excellent results are obtained with the allyl esters by polymerizing with 2% benzoyl peroxide and heating 24 hours at 65° C., then heating at 90° C. for 6 hours, and completing the curing at 105° C. for an additional 18 hours.

The following examples illustrate the infusible polymers for a number of esters.

EXAMPLE XII

Diallyl malate acetate prepared according to Example II was polymerized by heating at 65° C. for 6 days in the presence of 2% benzoyl peroxide. An optically clear polymer was obtained having a Barcol hardness of 45-50.

EXAMPLE XIII

A sample of diallyl tartrate diacetate prepared as described in Example V was polymerized in the presence of 2% benzoyl peroxide by heating at 65° C. for 6 days. A clear polymer was obtained that had a Barcol hardness of 30-40.

EXAMPLE XIV

The infusible polymer of diallyl tartrate dipropionate prepared according to Example VII was obtained by heating in the presence of 2% benzoyl peroxide at 65° C. for 6 days. The clear polymer had a Barcol hardness of 32.

EXAMPLE XV

Diallyl tartrate dibutyrate obtained as described in Example VIII was polymerized at 65° C. for 6 days in the presence of 1% benzoyl peroxide. The clear infusible polymer had a Barcol hardness of 10-20.

EXAMPLE XVI

The diallyl saccharate tetra-acetate obtained as reported in Example XI was polymerized by heating for 6 days at 65° C. in the presence of 5% benzoyl peroxide. The casting was clear with a Barcol hardness of 28-34.

As was stated hereinbefore, the polymers of the invention possess a community of excellent physical properties. For the purposes of illustrating these properties and comparing them with closely related, known polymers, the esters listed in the following table were polymerized to the infusible state and the noted tests were performed upon them. It will be observed from the table that polymers of the invention have excellent strength and hardness as shown by results of standard strength tests. Furthermore, their ability to transmit light is only slightly impaired upon exposure to weather which exposure has the tendency to discolor many resinous polymers of allyl esters and diminish their transparency and ability to transmit light.

The stability of polymers of the invention toward contact with water, dilute alkali and acid was determined for comparison with that of polymeric diallyl tartrate. This was determined by immersing weighed pieces of the polymer of the esters listed in the table below in the noted medium. After immersion for the indicated time, the pieces were again weighed. The percentage gain or loss in weight is given in the table. It will be noted from the results that the polymers of the invention have excellent stability in each of the mediums while that of polymeric diallyl tartrate is inferior in stability against water and acid and three-quarters of the polymer disintegrated and disappeared in dilute alkali.

*Weight percent change on submersion tests*

| Medium | Water | | | 10% NaOH | | | 3% $H_2SO_4$ | | |
|---|---|---|---|---|---|---|---|---|---|
| Time | 24 hrs. | 1 wk. | 2 wks. | 24 hrs. | 1 wk. | 2 wks. | 24 hrs. | 1 wk. | 2 wks. |
| Diallyl tartrate | 0.7 | 2.1 | 3.1 | −15.7 | −66.7 | −74.9 | 0.6 | 2.1 | 3.0 |
| Diallyl tartrate diacetate | 0.5 | 1.3 | 1.6 | 0.3 | 0.2 | −0.5 | 0.5 | 1.3 | 1.6 |
| Diallyl tartrate dipropionate | 0.4 | 1.0 | 1.1 | 0.3 | 0.3 | −0.1 | 0.3 | 0.8 | 0.9 |
| Diallyl tartrate dibutyrate | 0.3 | 0.6 | 0.6 | 0.2 | 0.3 | 0.1 | 0.3 | 0.6 | 0.6 |

Although the foregoing description has emphasized the homopolymers of the esters, copolymers are of value for many uses. The copolymers can be formed from mixtures of two or more esters of the invention or from mixtures of other types of compounds.

Typical copolymerizable compounds are those containing in the molecule a single polymerizable olefinic linkage such as styrene, vinyl halides, vinylidene halides, vinyl esters of saturated monocarboxylic acids, methyl acrylate, methyl methacrylate, allyl halides, allyl esters of saturated monocarboxylic acids, etc. Another important group consists of unconjugated polymerizable compounds having in the molecule two or more non-conjugated polymerizable unsaturated linkages such as unsaturated aliphatic polyesters of saturated polybasic acids, polyesters of saturated polyhydric alcohols with unsaturated organic acids, and esters of unsaturated alcohols with unsaturated aliphatic acids. Other polymerizable unsaturated compounds are those containing in the molecule one or more polymerizable organic radicals and one or more inorganic radicals or elements as exemplified by the vinyl, allyl and methallyl esters of phosphoric acid and of the ortho acids of silicon, boron, etc. Another important group of copolymerizable compounds consists of those having in the molecule two or more, preferably two, conjugated unsaturated polymerizable carbon-to-carbon linkages such as conjugated butadiene, conjugated chlorobuta-

| | Diallyl Phthalate | Diallyl Succinate | Diallyl Malate | Diallyl Malate Acetate | Diallyl Tartrate | Diallyl Tartrate Diacetate | Diallyl Tartrate Dipropionate | Diallyl Tartrate Dibutyrate |
|---|---|---|---|---|---|---|---|---|
| Polymerization conditions | A [1] | A | A | A | A | A | B [2] | B |
| Per cent benzoyl peroxide used | 2 | 2 | 2 | 2 | 0.5 | 1 | 2 | 2 |
| Barcol hardness | 40 | 8 | 0 | 49 | 42 | 49 | 41 | 26 |
| Rockwell hardness, M scale | 110 | | | 113 | 110 | 107 | 111 | 106 |
| Tensile strength, lbs. per sq. in | 7,500 | [3] | [3] | 3,600 | 4,200 | 4,200 | | |
| Edgewise compression strength, lbs. per sq. in | 24,000 | | | 36,400 | 21,000 | 23,000 | 25,300 | 18,200 |
| Flexural strength, lbs. per sq. in | 13,500 | | | 11,200 | 8,760 | 11,000 | 10,400 | 4,300 |
| Dynstat impact strength, kg. per sq. cm | 25 | | | 18 | 22 | 6.1 | 6.0 | 8.0 |
| Per cent light transmission at 425 mu original | 85 | | | 78 | 84 | 89 | 90 | 88 |
| After 7 days southern exposure on roof | 67 | | | 73 | 85 | 86 | 87 | 88 |
| After 35 days southern exposure on roof | 64 | | | 68 | 86 | 86 | 80 | 80 |

[1] Heating at 65° C for 144 hours.
[2] Heating 24 hours at 65° C., 6 hours at 90° C. and 18 hours at 105° C.
[3] Polymeric diallyl succinate and diallyl malate had such low physical strength that the strength tests could not be performed on them.

diene, isoprene, the other conjugated pentadienes, the conjugated hexadienes, their homologues, analogues and suitable substitution products. Particularly valuable copolymers are those of the compounds of the invention with one or more allyl-type diesters of dicarboxylic acids containing in the molecule an ether linkage positioned between the carboxy groups. An example of such ether-containing dicarboxylic acid esters is diallyl diglycolate.

We claim as our invention:

1. A diallyl ester of an acyloxylated aliphatic dicarboxylic acid, said acid having the carboxyl groups separated by a straight chain of up to six aliphatic carbon atoms to each of which is directly linked one acetyloxy radical.

2. An infusible polymer of the ester defined by claim 1.

3. A diallyl ester of a tartaric acid ester which has each of the hydroxy groups thereof esterified with a saturated fatty acid of not more than 4 carbon atoms.

4. An infusible polymer of a diallyl ester of a tartaric acid ester which has each of the hydroxy groups thereof esterified with a saturated fatty acid of not more than 4 carbon atoms.

5. Diallyl tartrate dipropionate.

6. An infusible polymer of diallyl tartrate dipropionate.

7. Diallyl saccharate tetra-acetate.

8. An infusible polymer of diallyl saccharate tetra-acetate.

9. Diallyl tartrate diacetate.

10. A polymer of diallyl tartrate diacetate.

11. An infusible polymer of diallyl tartrate diacetate.

12. An ester of an acyloxylated aliphatic dicarboxylic acid having the hydrogen atom of each of the two carboxylic acid groups replaced by the hydrocarbon radical of a beta,gamma-monoolefinic monohydric alcohol of up to 6 carbon atoms, and said ester having the two carboxyl groups of said dicarboxylic acid separated by a straight chain of up to six aliphatic carbon atoms to each of which is directly linked one acyloxy radical of a saturated fatty acid of up to 4 carbon atoms.

13. A polymer of the ester defined by claim 12.

LYNWOOD N. WHITEHILL.
EDWARD C. SHOKAL.

REFERENCES CITED

The following references are of record in the file of this patent:

UNITED STATES PATENTS

| Number | Name | Date |
|---|---|---|
| 1,927,295 | Powers | Sept. 4, 1933 |
| 2,141,546 | Strain | Dec. 27, 1938 |
| 2,164,188 | Groll et al. | June 27, 1939 |
| 2,218,439 | Rothrock | Oct. 15, 1940 |
| 2,236,516 | Cahan et al. | Apr. 1, 1941 |
| 2,311,327 | Bradley | Feb. 16, 1943 |
| 2,367,798 | Rehberg et al. | Jan. 23, 1945 |
| 2,372,808 | Bruson | Apr. 3, 1945 |
| 2,384,117 | Muskat et al. | Sept. 4, 1945 |
| 2,387,932 | Muskat et al. | Oct. 30, 1945 |